March 17, 1936.  H. S. EBERHARD  2,034,135

TRACTOR

Filed March 20, 1933

INVENTOR.
HARMON S. EBERHARD.

ATTORNEY

Patented Mar. 17, 1936

2,034,135

UNITED STATES PATENT OFFICE 2,034,135

TRACTOR

Harmon S. Eberhard, Peoria, Ill., assignor to Caterpillar Tractor Co., San Leandro, Calif., a corporation of California Application March 20, 1933, Serial No. 661,660

9 Claims. (Cl. 305—9)

The present invention relates to tractors, and more particularly to the provision of improved suspension means for the main frame of a track-type tractor.

It is an object of the invention to provide resilient suspension means for a tractor main frame which is of simple, sturdy design, requiring a small number of parts.

Another object of the invention is to provide resilient equalizing means for supporting a tractor main frame on a pair of endless track mechanisms, said means being adapted for easy assembly and economical manufacture.

Another object of the invention is to provide resilient equalizing means for supporting a tractor main frame, including a crankcase, on a pair of endless track mechanisms, said crankcase comprising a one-piece casting having integrally formed portions for connecting said equalizing means thereto.

Another object of the invention is to provide resilient equalizing means for supporting a tractor main frame on a pair of endless track mechanisms, including a main equalizer bar and an auxiliary equalizer bar, said bars being connected to integral portions of the main frame.

Another object of the invention is to provide resilient equalizing means for supporting a tractor main frame on a pair of endless track mechanisms, said equalizing means having connections with said main frame consisting of substantially vertically aligned elements.

Description of mechanism

The track-type tractor disclosed herein includes a main frame, comprising a transmission case and a crankcase, which is pivotally and resiliently supported on a pair of endless track mechanisms. The endless track mechanisms, therefore, are capable of restrained oscillatory movement with respect to the main frame when the tractor is travelling over an uneven surface. Each endless track mechanism includes a track roller frame having a plurality of track rollers mounted therein which run over the ground stretch of the endless track, transmitting the weight of the tractor thereto. The tractor is propelled over the tracks by a pair of final drive sprockets mounted on the transmission case at the rear of the track roller frames, said drive sprockets also serving to pick up the tracks, which pass over track carrier rollers, and front idler wheels on the track roller frames.

Figure 2:
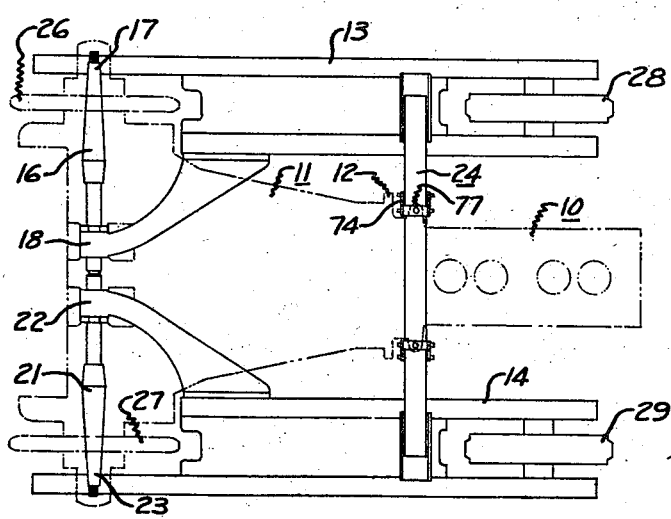
Fig. 2 is a schematic plan view of the tractor.

The main frame (Fig. 2) comprising crankcase 10 and transmission case 11, detachably connected at 12, is supported on track roller frames 13, 14. Stub shaft 16, mounted in transmission case 11, provides spaced pivotal connections at 17, 18 between said main frame and track roller frame 13, and similar stub shaft 21 similarly connects track roller frame 14 to the main frame at 22, 23. The spaced pivotal connections serve to maintain the endless track mechanisms in alignment with the main frame. The front end of said main frame is supported on track roller frames 13, 14 by resilient equalizing means indicated generally at 24 in Fig. 2, and described more specifically hereinafter.

Figure 1:
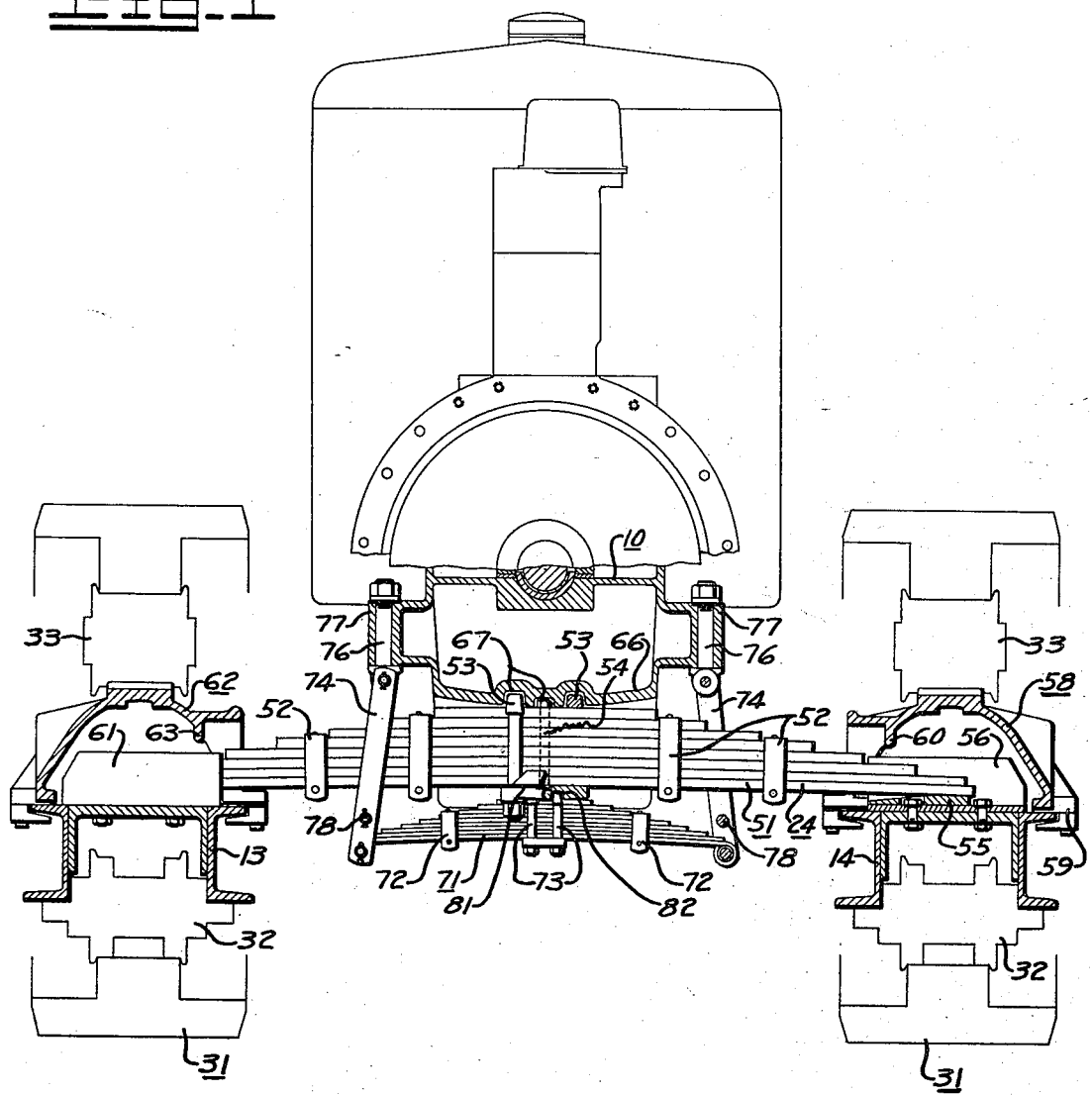
Fig. 1 is a transverse, vertical section through a track-type tractor looking toward the front of the machine, illustrating the resilient equalizing means for supporting the front end of the tractor main frame on the track roller frames.

The endless tracks pass over final drive sprockets 26, 27, mounted on transmission case 11 at the rear of respective track roller frames 13, 14, and front idler wheels 28, 29, mounted in the front ends of said frames 13, 14. Said tracks are indicated generally at 31 in Fig. 1, and the weight of the tractor is transmitted to the ground stretches thereof by track rollers 32 mounted on said frames 13, 14, the upper stretches of said tracks 31 being supported by track carrier rollers 33 on said frames 13, 14. Thus the main frame of the tractor is supported on a pair of endless track mechanisms which can oscillate independently with respect thereto in travelling over uneven ground, such oscillation being restrained, however, by resilient equalizing means which will now be described.

The resilient equalizing means, or equalizer bar suspension, for supporting the front end of the main frame on the track roller frames comprises a leaf spring having its ends resting freely on the respective track roller frames for lateral play with respect thereto, and being yieldably connected intermediate its ends to the main frame for limited rocking movement with respect thereto. The main equalizer spring or bar described above is held against the main frame by an auxiliary leaf spring arranged in tandem relation therewith, the ends of said auxiliary spring being connected to said main frame, and the central portion thereof engaging said main spring. The engaging portions of said main frame and said main spring, and said auxiliary spring and said main spring have inter-engaging portions which permit relative rocking movement while restraining relative lateral or endwise movement.

Main equalizer spring or bar 51 (Fig. 1) comprises a plurality of spring leaves secured together by outer clips 52, central clips 53, and bolt 54. The right end of said spring 51, as viewed in Fig. 1, rests on tapered plate 55, within U-shaped guide 56 bolted on track roller frame 14 within yoke 58, which is slidably mounted at 59 on said frame 14 for supporting front idler 29. Said yoke 58 is provided with integral stop 60 above spring 51 for limiting relative vertical movement of said spring and said frame 14. The left end of spring 51 is supported similarly within U-shaped guide 61, on track roller frame 13 within yoke 62, having stop 63, similar to stop 60. Thus the ends of the main equalizer bar are supported on the track roller frames, for free lateral movement and restricted vertical movement, the guides preventing movement of said spring ends longitudinally of said track roller frames.

Crankcase 10 has arcuate bottom wall 66 resting on spring 51, and having spaced recesses 67 formed therein to receive the heads of clips 53 and bolt 54. The arcuate contour of wall 66 provides for relative rocking movement of the main frame on the main equalizer bar, while the inter-engagement of the wall with said clips and said bolt prevents relative lateral or endwise movement therebetween.

Auxiliary equalizer spring or bar 71 comprises a plurality of spring leaves secured together by outer clips 72 and inner clips 73. The ends of said auxiliary spring 71 are connected by pairs of shackles 74 pivoted thereto and to bolts 76 secured in vertically apertured, laterally projecting bosses 77 integral with crankcase 10. Opposite shackles 74 of each pair are placed on either side of main spring 51, pins 78 therein limiting relative rocking movement between said main spring and said crankcase. It is to be noted that each pair of shackles 74 and bolt 76 associated therewith are in substantial vertical alignment.

The above described connections from the crankcase to the ends of the auxiliary equalizer spring hold the central upper part thereof in engagement with the arcuate bottom surface of plate 81 to which the ends of clips 53 are secured. Said bottom surface is recessed as at 82 to receive the heads of clips 73. Thus auxiliary equalizer spring 71 and main equalizer spring 51 have a limited relative rocking movement, relative lateral or endwise movement therebetween being prevented by the interengagement of plate 81 and the heads of clips 73. From the foregoing it is seen that the auxiliary equalizer spring, or bar not only serves to maintain engagement between the main equalizer spring or bar and the main frame, but also serves to limit relative rocking movement therebetween.

It is to be noted that the above described resilient equalizing means consists of a small number of parts of simple design, providing a sturdy and reliable connection between said means, the crankcase or main frame, and the track roller frames. It is also to be noted that both equalizer springs are connected directly to, or contact integral parts of the crankcase, which comprises a one-piece casting. The casting requires no drilled holes other than those in bosses 77 which are located in the most advantageous position to obtain economy of manufacture. In assembling the tractor main frame and the equalizer springs, it is only necessary to lower the crankcase portion of the main frame vertically into place on the main equalizer spring 51; allowing the upright pins or bolts 76 to pass through the vertically apertured bosses 77. When the crankcase is in position on the main equalizer spring, the nuts for the bolts 76 may be readily placed thereon and tightened as desired. It is thus seen that ease of assembly or disassembly of the main frame and the equalizer structure is provided by the provision of upright members 76 which can be positioned or be removed from the upright apertures in bosses 77, solely by virtue of relative vertical displacement.

I, therefore, claim as my invention:

1. In a track-type tractor, a main frame comprising a casing, a pair of endless track mechanisms including track roller frames, aligned pivotal connections between said main frame and said track roller frames, and resilient equalizing means for supporting said main frame on said track roller frames, comprising a main equalizer bar having its ends resting on said track roller frames at points spaced from said pivotal connections, said casing having an arcuate bottom wall resting on said main equalizer bar centrally thereof, said wall and said bar having interengaging portions, an auxiliary equalizer bar in vertical tandem relation with said main equalizer bar, integral vertically apertured bosses on said casing, and means connecting the ends of said auxiliary equalizer bar to said bosses, each connecting means comprising a pair of shackles and a bolt in substantial vertical alignment, the central portion of said auxiliary bar engaging an arcuate surface on said main bar, said portion and said surface having interengaging portions.

2. In a track-type tractor, a main frame comprising a casing, a pair of endless track mechanisms including track roller frames, aligned pivotal connections between said main frame and said track roller frames, and resilient equalizing means for supporting said main frame on said track roller frames, comprising a resilient member having its ends supported by said track roller frames at points spaced from said pivotal connections, a second resilient member disposed beneath said first member and connected thereto for relative rocking movement, and connecting means from the ends of said second member to said casing, each connecting means comprising a laterally projecting, vertically apertured boss on said casing, a bolt in said boss, and shackles pivotally connected to said bolt and the end of said second member.

3. The combination with the main frame of a tractor and a pair of track roller frames pivotally connected thereto, said frame including a crankcase, said crankcase comprising a one-piece casting forming the crankcase of the tractor engine, said casting having an arcuate bottom wall with spaced recesses formed therein, and integral vertically apertured bosses projecting laterally from said casting; of means for supporting said main frame on said track roller frames at points spaced from the pivotal connections therebetween, including a main equalizer bar supporting said casting, said bar having its ends movably supported by said track roller frames, and having portions engaging said recesses in said bottom wall, an auxiliary equalizer bar for maintaining engagement between said main bar and said casting, and connections between said auxiliary bar and said bosses.

4. The combination with the main frame of a tractor and a pair of track roller frames pivotally connected thereto, said frame including a casing, of means for supporting said main frame on said track roller frames at points spaced from the pivotal connections therebetween, comprising a main equalizer bar supporting said casing and having its ends movably mounted on said track roller frames, and an auxiliary equalizer bar for maintaining engagement between said main bar and said casing while providing for relative rocking movement therebetween, said auxiliary bar having its ends connected to integral lateral projections on said casing by means consisting of members in substantial vertical alignment.

5. The combination with the main frame of a track-type tractor, and track roller frames having aligned pivotal connections with said main frame, of means for supporting said main frame on said track roller frames at points spaced from said pivotal connections, comprising a main equalizer bar on which said main frame rests and having its ends supported on said track roller frames, an auxiliary equalizer bar engaging said main bar to maintain engagement thereof with said main frame, vertically apertured, opposite means projecting laterally from the sides of said main frame, and connections from the ends of said auxiliary bar to said opposite means.

6. The combination with the main frame of a track-type tractor, and track roller frames having aligned pivotal connections with said main frame, of means for supporting said main frame on said track roller frames at points spaced from said pivotal connections, comprising a main equalizer bar on which said main frame rests and having its ends supported on said track roller frames, an auxiliary equalizer bar engaging said main bar to maintain engagement thereof with said main frame, vertically apertured, opposite bosses projecting laterally from the sides of said main frame, and connections from the ends of said auxiliary bar to said opposite bosses, each connection consisting of a bolt in the associated boss, and shackles connecting said bolt and the associated end of said auxiliary bar.

7. In a track-type tractor, a main frame, ground-engaging mechanism at each side of said main frame and connected thereto for relative movement, an equalizing member extending transversely with respect to said main frame and supported by said ground-engaging mechanisms to control movement thereof, said equalizing member providing a support for said main frame, auxiliary equalizing means below said equalizing member; and means for connecting said auxiliary equalizing means to said main frame upon relative vertical displacement therebetween, including upright pins insertable in said main frame, and links movably connected to said auxiliary equalizing means and to said pins.

8. In a vehicle, a main frame, ground-engaging mechanism at each side of said main frame and extending longitudinally thereof, connections between said mechanisms and said main frame providing for relative movement therebetween, an equalizing member extending transversely of said frame and supported by said mechanisms to control movement thereof, said equalizing member providing a support for said frame, auxiliary equalizing means below said equalizing member; and means for connecting said auxiliary equalizing means to said main frame, comprising upright pins mounted on said main frame, and links movably connected to said auxiliary equalizing means and to said pins.

9. In a track-type tractor; a main frame; ground-engaging mechanism at each side of said main frame and connected thereto for relative movement; an equalizing member extending transversely with respect to said main frame and supported by said ground-engaging mechanisms to control movement thereof, said equalizing member providing a support for said main frame; auxiliary equalizing means adjacent said equalizing member; and connections from said auxiliary equalizing means to said main frame assembled or disassembled by relative vertical displacement between said main frame and said connections including upright pins insertable in upright apertured means on said main frame.

HARMON S. EBERHARD.